United States Patent [19]
Pierpoint

[11] Patent Number: 4,821,410
[45] Date of Patent: Apr. 18, 1989

[54] ELECTRICAL CORD FILLER REMOVAL APPARATUS AND METHOD

[76] Inventor: James W. Pierpoint, 4610 Yuma Ct., Winston-Salem, N.C. 27107

[21] Appl. No.: 82,747

[22] Filed: Aug. 7, 1987

[51] Int. Cl.⁴ .............................................. H01R 43/00
[52] U.S. Cl. ...................................... 29/825; 134/19; 219/370; 219/373; 219/374; 239/424
[58] Field of Search ................... 134/19, 15; 239/424; 29/825; 432/8, 59, 222; 219/364, 370, 373, 374

[56] References Cited
U.S. PATENT DOCUMENTS

| | | | |
|---|---|---|---|
| 2,291,862 | 8/1942 | Bailey | 134/19 X |
| 2,432,868 | 12/1947 | Earl et al. | 134/19 |
| 3,342,638 | 9/1967 | Wanzenberg | 134/19 X |
| 3,374,117 | 3/1968 | Savage | 134/19 X |
| 3,749,602 | 7/1973 | Mosier | 134/19 |

Primary Examiner—Carl J. Arbes

[57] ABSTRACT

An apparatus and method are presented for removing filler from electrical cords during manufacture. The electrical cord is stripped of its outer jacket to expose the filler and conductors and thereafter positioned within a nozzle where the stripped end is subjected to microprocessor controlled heated and unheated air pulses to degrade and remove the filler along the stripped end portion prior to attaching the cord conductors to electrical appliances or the like.

25 Claims, 10 Drawing Sheets

ELECTRICAL CORD FILLER REMOVAL APPARATUS AND METHOD

BACKGROUND OF THE INVENTION

1. Field Of The Invention

The present invention relates to the assembly of electrical products such as household appliance cords and particularly to electrical supply cord processing prior to connection to the appliance.

2. Description Of The Prior Art And Objectives Of The Invention

Electrical consumer products manufactured for use in the United States usually require a conventional 110 volt AC, 60 cycle household current and are sold by various manufacturers with an electrical cord having a male plug attached. With the increase in the demand of such consumer products in recent years, manufacturers and producers of a variety of consumer devices have sought ways to increase productivity and to save costs in an ever-increasing competitive market. Household items such as electric fans, can openers, steam irons, hair dryers, radios and other products have an electrical cord with two or three conductors which are generally vinyl clad and contained within an outer jacket also conventionally made from a vinyl material. The conductors are positioned within the outer jacket in a helix configuration and also contained therein are two (2) or three (3) bundles of fiberous filler material which is conventionally made from polypropylene or other synthetic, non-conducting materials. Filler formed from paper is also still used to some degree but the extent of its use has diminished in recent years.

In order to attach the electrical conductors of an electrical cord to an appliance or to a male plug, a section of the outer jacket and filler therealong have to be first removed. Various machines have been developed to remove filler from electrical cords such as shown in my previous pending U.S. patent application Ser. No. 06/902,425 now U.S. Pat. No. 4,769,903. However, such prior devices have required manual control and dexterity such as requiring the operator to "roll" the cord end over a "blade" of hot air to effect filler removal. Such prior art devices and methods have been successful but because of the higher production demands and efficiency requirements, it has been long sought to do away with the operator's skill, dexterity and judgment during filler removal operations.

With the present background well documented and the disadvantages known of conventional filler removal devices and methods, the present invention was conceived and one of its objectives is to provide an electrical cord filler removal apparatus which will eliminate the necessity of an operator turning or rotating the electrical cord during filler degradation and subsequent removal.

It is another objective of the present invention to provide a filler removal apparatus and method in which a degradation fluid strikes the cord from an encircled position to provide quick and uniform degradation completely around the cord regardless of the filler placement along or among the electrical conductors.

It is also an objective of the present invention to provide a receptacle for receiving an electrical cord end (which has had its outer jacket removed) having a conically shaped entrance to assist in guiding the stripped cord end therein.

It is still another objective of the present invention to provide an apparatus which includes a microprocessor which will control conditioned and ambient fluids to the receptacle and cord for adjustably controlling the temperature, time, frequency and velocity of the fluids which are used to degrade and remove the filler from the electrical cord to insure a fast and cost efficient removal method.

Various other objectives and advantages of the present invention will become apparent to those skilled in the art as a more detailed presentation of the apparatus and methods of filler removal are presented below.

SUMMARY OF THE INVENTION

The aforesaid and other objectives are realized by utilizing filler removal apparatus and methods which include a receptacle for receiving an electrical cord which has had an end of the outer jacket stripped away. The receptacle or nozzle includes a mixing chamber where a conditioned fluid such as heated air is received and is then directed to a columnated area which completely encircles the cord. Heated air passing from a heating means through the nozzle exits the columnated area against the cord filler and vinyl-clad conductors at approximately 600° C. to cause degradation to the filler material yet the vinyl-clad portions covering the conductors are unharmed at the elevated temperatures due to the short time exposure. A conically shaped opening at the front of the nozzle allows the cord to be easily inserted therein whether done manually or automatically by robotics or the like. As the cord is being inserted, its stripped end comes to rest against a stop member after breaking a sensing beam which identifies the presence of the cord and signals a microprocessor. Valves controlled by the microprocessor direct heated and cool air to the nozzle for impingement against the filler to precisely control filler degradation. A series of microprocessor controlled blow tubes are positioned near the rear exit of the cord channel within the nozzle whereby fluid such as ambient air passing through said blow tubes will strike the exposed filler in the stripped area of the cord to assist in filler removal after degradation by the heated air.

DESCRIPTION OF THE PREFERRED EMBODIMENTS

The preferred method of the invention comprises removing filler from electrical cords by stripping the outer jacket a suitable length along the cord to expose the filler and clad conductors therein. Next, the stripped end of the cord is inserted into a conically shaped end of a nozzle having a channel which acts as a receptacle for the cord. A degradation fluid such as hot air is directed through a passageway in the nozzle to a columnated area which completely surrounds the centralized cord channel and which communicates with it. Hot air passing therethrough causes degradation to the filler cord as it exits the columnated area. The passage of ambient air into the nozzle to mix with the heated air quickly drops the temperature from approximately 600° C. to slightly above 300° C. to prevent damage to the vinyl-clad conductors. Thereafter, pulsed ambient air is directed through blow tubes surrounding the stripped cord to cause the filler to bend and break along its degradated areas.

The preferred apparatus of the invention comprises a cylindrically shaped nozzle having a cord bore or channel centrally disposed therein and having a conically shaped entrance. Positioned at the rear of the channel and spaced therefrom is a cord stop member which is adjustably positioned relative to the nozzle. Within the nozzle are a series of passageways which communicate with the cord channel where a conditioned fluid such as hot air or ambient air is allowed to flow. A photoelectric sensor is positioned between the cord channel and cord stop member to sense the movement of a cord as it passes along to the stop member. An electrical resistance heater is in communication with the nozzle passageways as are ambient air conduits and blow tubes are spaced from said nozzle for separating the filler from the cord. An air compressor communicates with a series of valves which are microprocessor controlled for supplying ambient air to the nozzle and blow tubes. A one (1) psi blower consisting of a centrifugal fan communicates with the heater for supplying conditioned air to the nozzle for preheating the nozzle and for degradation purposes. The programmable microprocessor also controls the centrifugal fan, the ambient air supplied to the nozzle and blow tubes thus providing extreme versatility and control for the filler removal process.

DETAILED DESCRIPTION OF THE DRAWINGS AND OPERATION OF THE INVENTION

Figure 1:
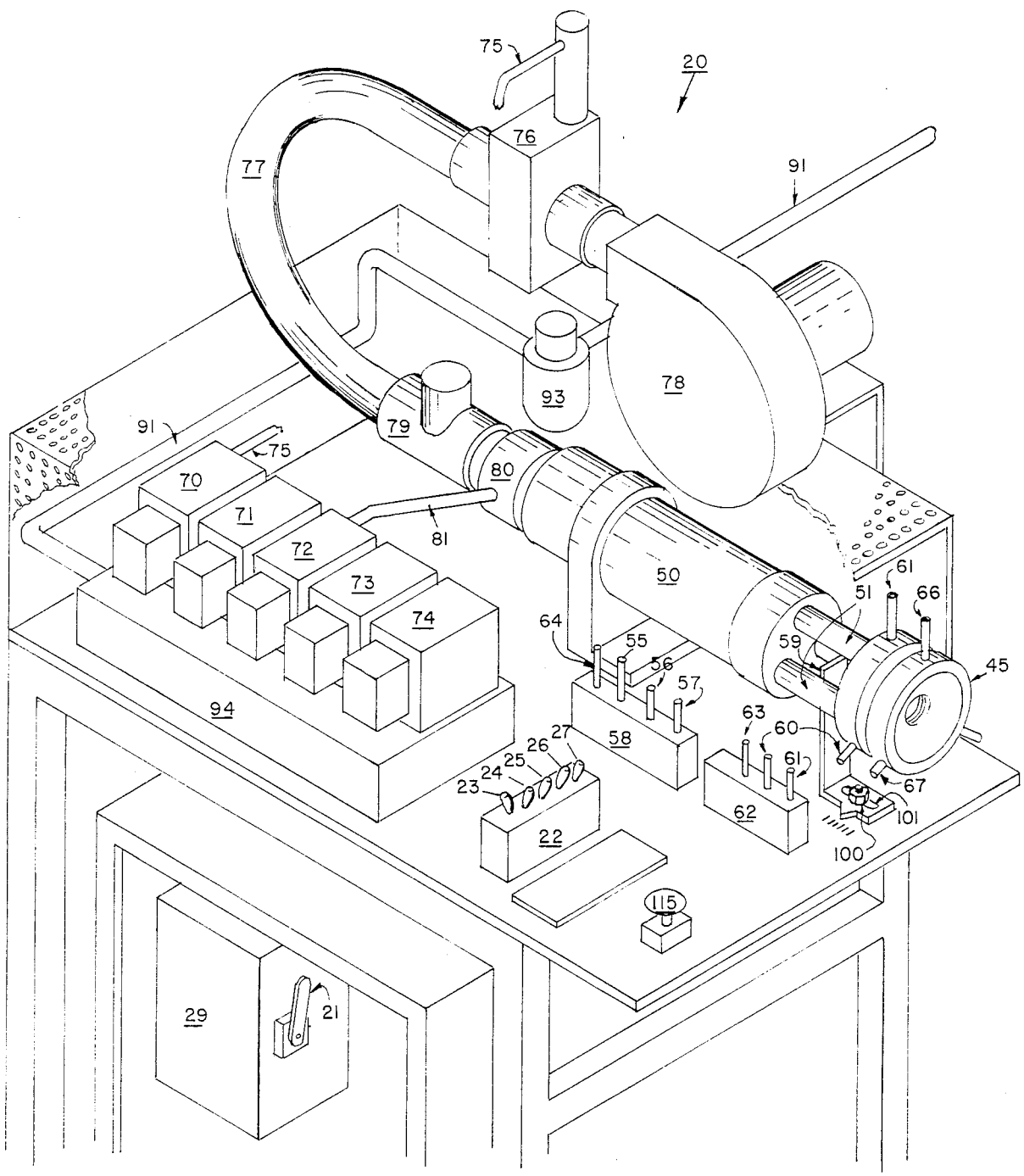
FIG. 1 shows in perspective fashion filler removal apparatus of the invention.
Figure 3:
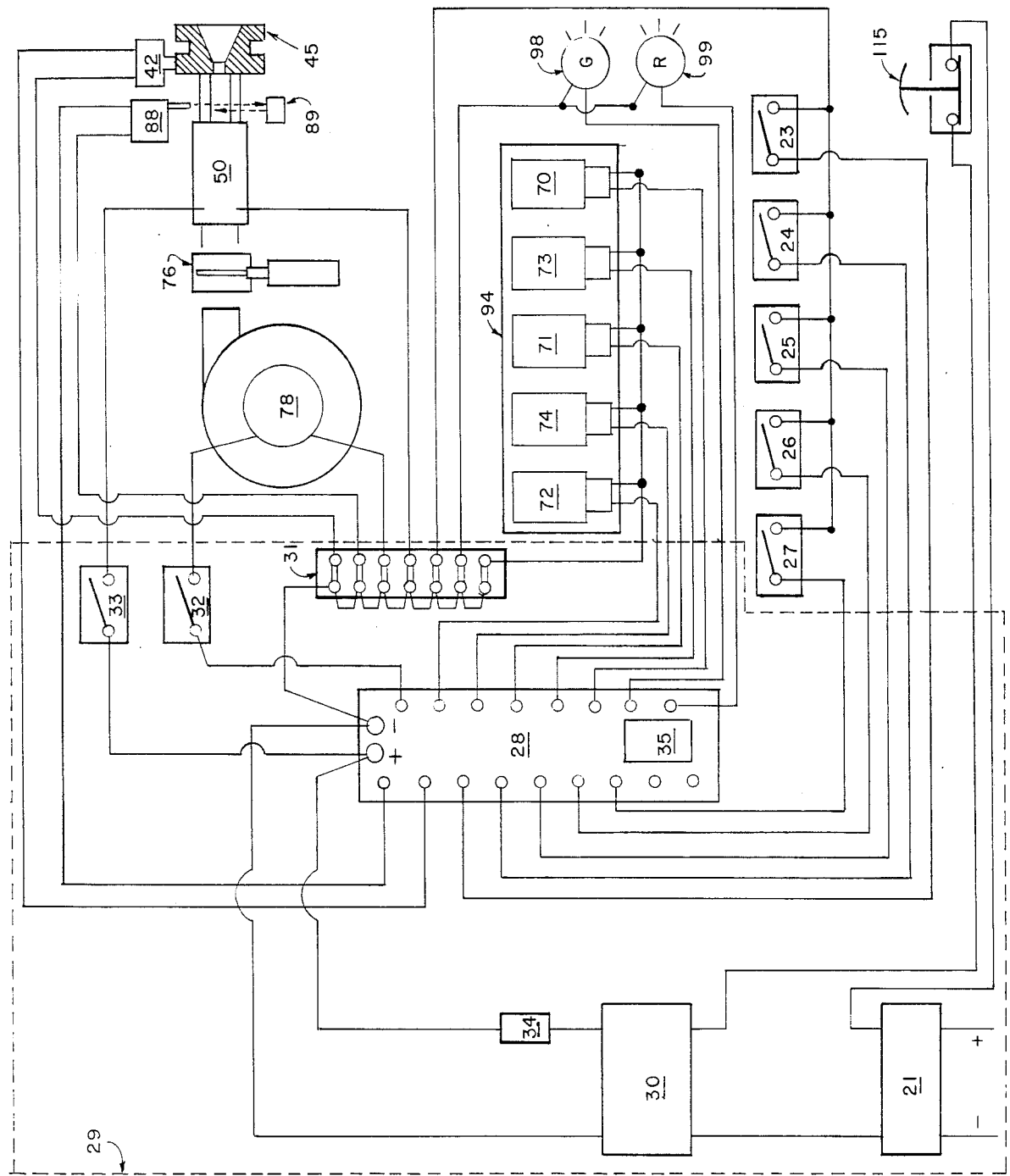
FIG. 3 demonstrates an electrical schematic of the invention.

For a more complete understanding of the invention and its use, turning now to the drawings, the operation of the invention is begun by activating power disconnect switch 21 as shown in FIG. 1 on the lower left-hand side of electrical junction box 29 of cord removal apparatus 20. Toggle switch panel 22 includes a plurality of five (5) cord select switches 23-27, each of which activates a different program in EE Prom 35 of microprocessor 28 as seen in FIG. 3. Junction box 29 also contains step-down transformer 30 with neutral terminal block 31, blower switch 32, heater switch 33 and transformer fuse 34. As would be understood, the particular switch of 23-27 that is selected prior to filler removal beginning is dependent upon the particular characteristics of the cord from which filler is to be removed, such as the filler thickness, the number of strands of filler and its material type as each program provides somewhat different time, temperature and pulse sequences. For example, a thin filler made from polypropylene may require a shorter degradation temperature and time than a cord having a thick filler made from polyolefin. Four (4) helically wound filler bundles may require a greater number of blow-off pulses than a cord with only two (2) sets of filler bundles.

Figure 5:
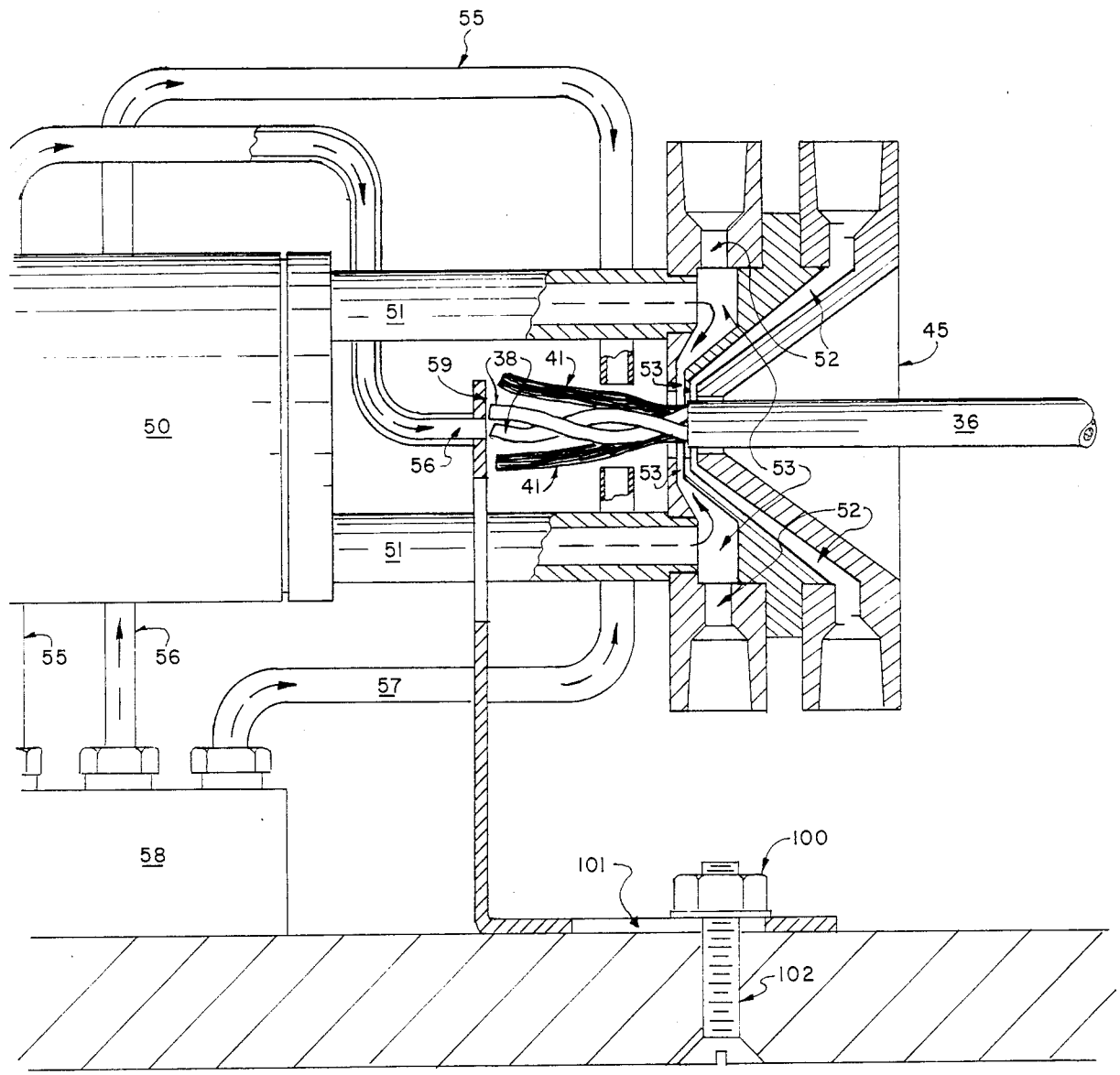
FIG. 5 shows the cord fully advanced into the nozzle with the filler blown slightly away from the conductors.
Figure 7:
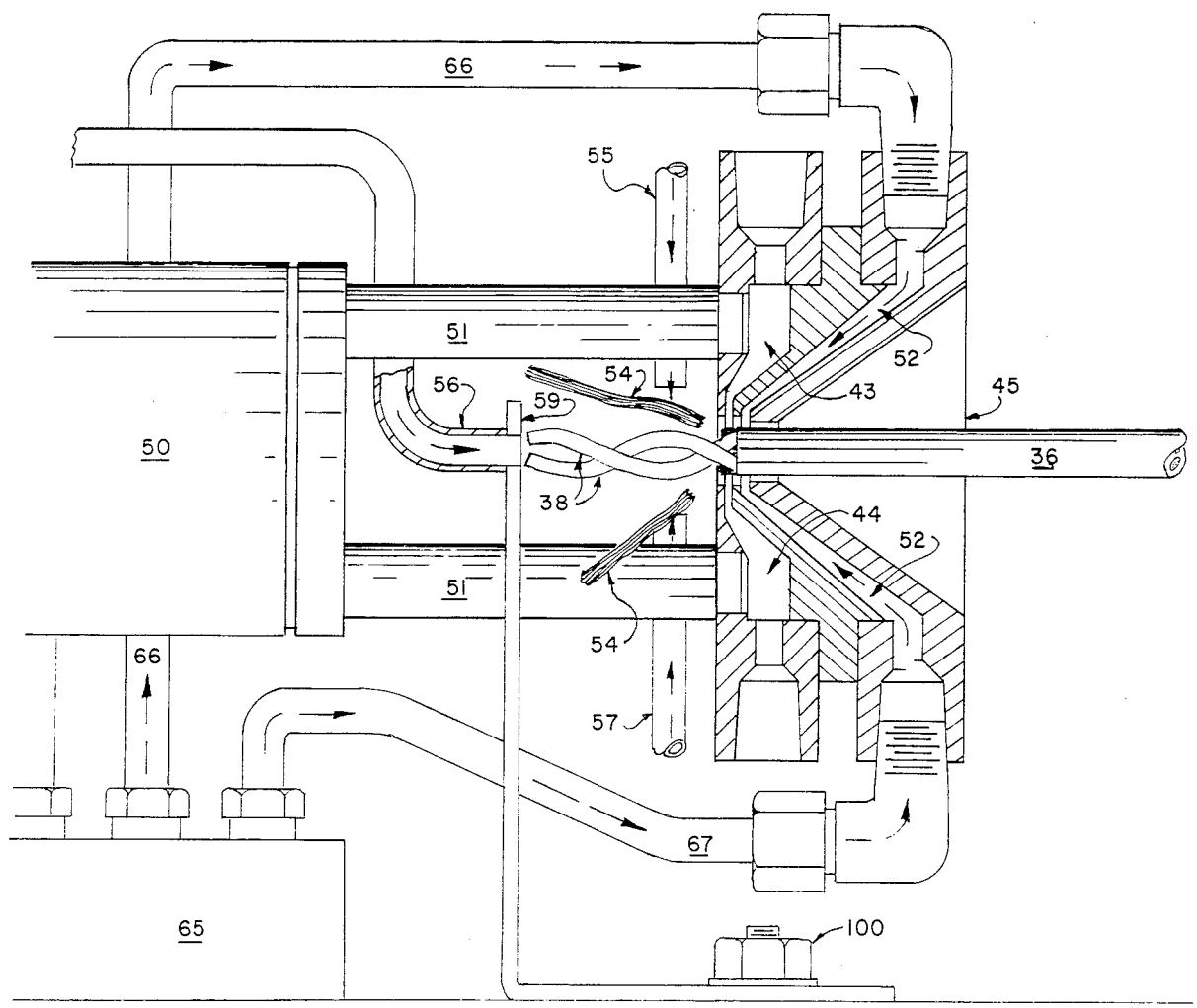
FIG. 7 shows the filler removed from the conductor.
Figure 8:
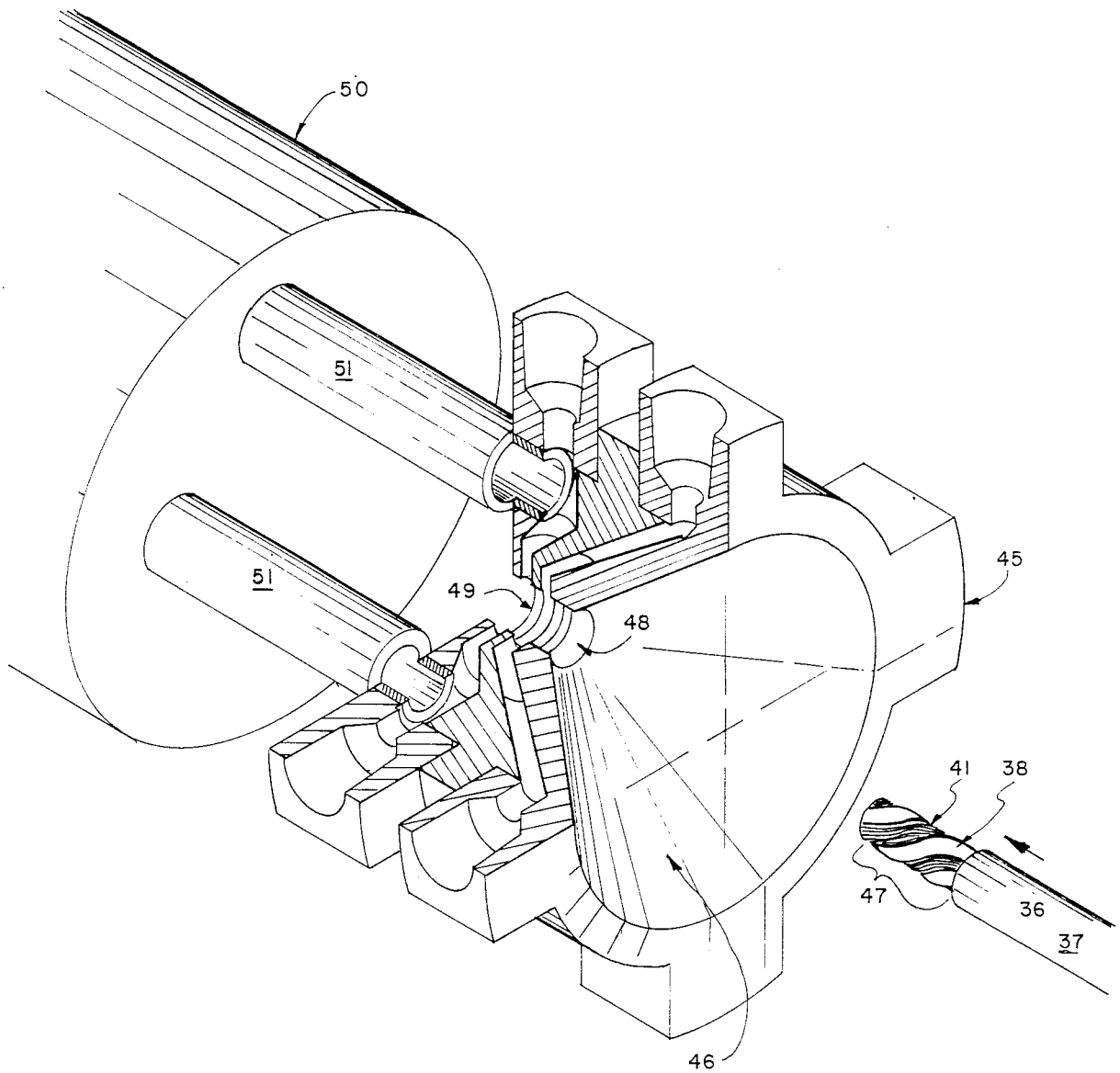
FIG. 8 shows a partial cross-sectional view of the nozzle prior to cord insertion.
Figure 9:
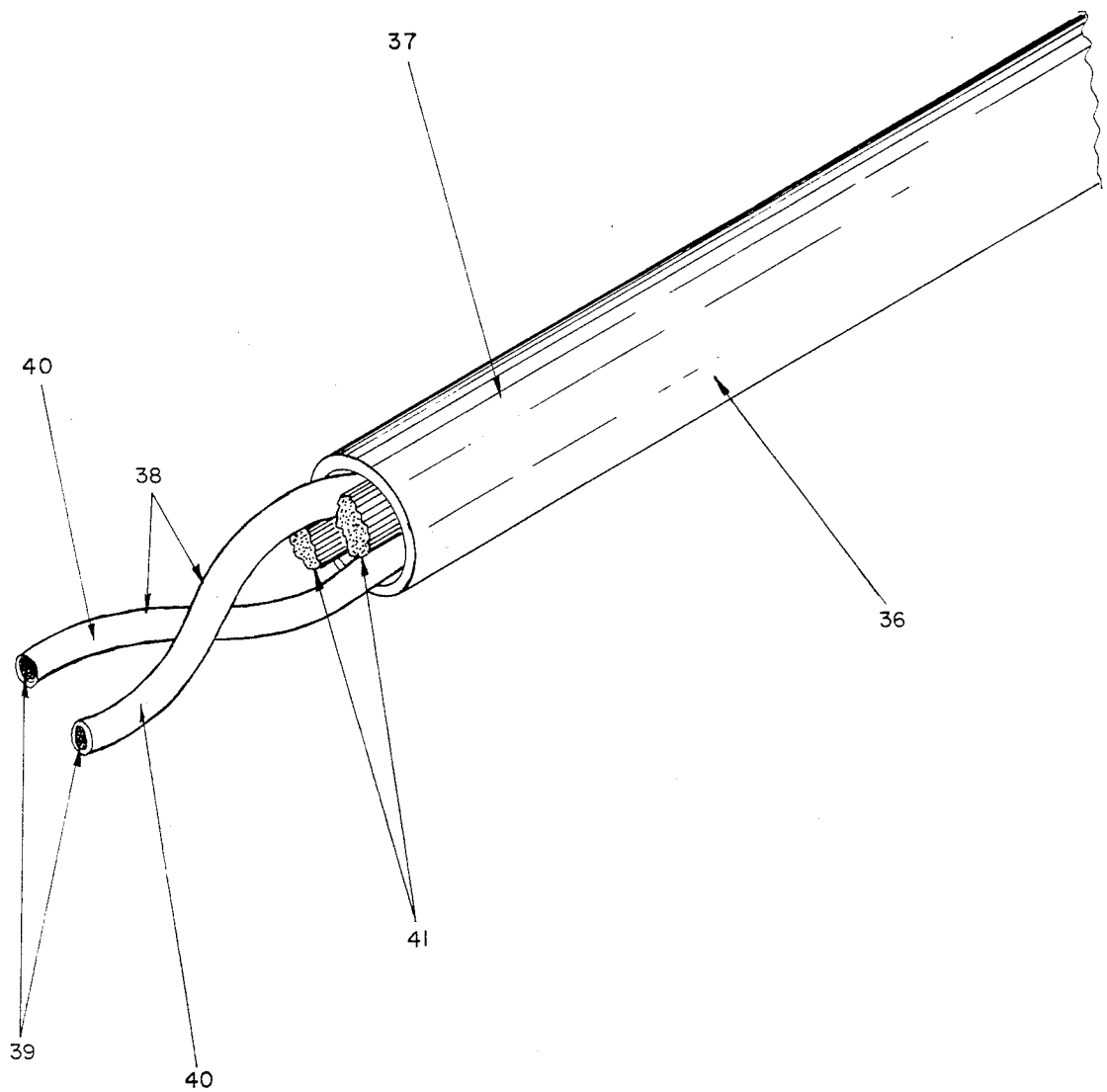
FIG. 9 demonstrates the cord with the filler removed from the exposed conductors.

Once said control means or microprocessor 28 has been programmed with different control commands for each cord type in EE Prom module 35, each is also present in microprocessor 28 RAM (not shown). The operator can then select from switches 23-27 depending on particular cord characteristics to be processed. For example, in FIGS. 5, 6, 7, 8 and 9 cord processing is shown with a two (2) conductor cord having two (2) bundles of filler strands. Cord 36 is best shown in FIG. 9 having an outer jacket 37 formed from a polyvinyl chloride (vinyl) composition with conductors 38 consisting of copper wires 39 also clad by a vinyl coating 40. Fillers 41 are formed from multiple strands of polypropylene fiber which are readily degraded by pulses of high temperature air (500°-600° C.) when positioned within nozzle 45 as shown in FIG. 8. Nozzle 45 provides a steady receptacle for cord 36 during filler removal. The partial cross-sectional view of nozzle 45 in FIG. 8 demonstrates that conical opening 46 allows cord 36 (having its outer jacket removed along section 47) to be easily inserted into cord channel 48. Heating means 50 as shown in FIG. 8 consists of an electrical resistance heater having heater tubes 51 communicating with nozzle 45. Heating means 50 can provide high temperatures of 700° C.-plus and is adjustable for particular operation and filler requirements. A plurality of nozzle passageways 52 is shown in FIG. 5 with fluid mixing chambers 53 where ambient air is combined with hot air for rapid temperature reduction.

Figure 2:
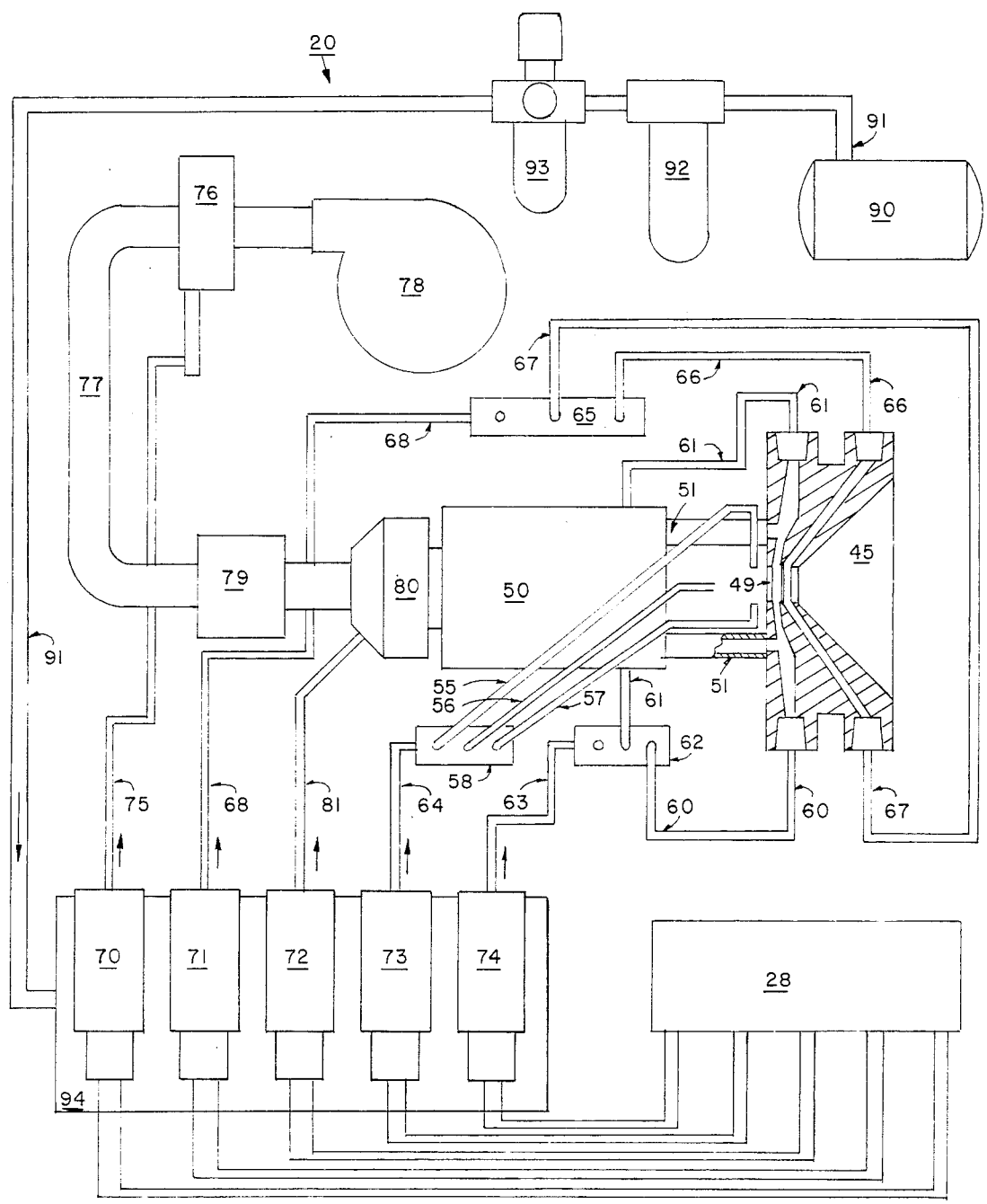
FIG. 2 demonstrates a pneumatic layout of the invention with the nozzle in cross-sectional form.

Blow tubes 55, 56 and 57 originate from blow tube manifold 58 which is joined to blow tube valve 73 by conduit 64 as shown in FIGS. 1 and 2 and extend proximate the cord channel exit 49 as demonstrated in FIG. 2. In FIG. 5, blow tube 56 is positioned within stop means 59 and is used to direct air against the stripped end of cord 36 to expand or slightly lift filler 41 from its helically wound configuration among conductors 38 to a slightly opened posture as seen in FIG. 5. The advantages and use of blow tubes 55, 56 and 57 are understood by reviewing the schematic layout of FIG. 2. As shown, ambient fluid supply means 90 consisting of a conventional air compressor having an ambient fluid supply means outlet conduit 91 with ambient fluid filter 92 and ambient fluid regulator 93 positioned thereon. Air passing from ambient supply means 90 is directed to ambient fluid supply valve manifold 94 at approximately eighty (80) psi where ambient air is then available for utilization by gate valve 70, blow-off valve 71, hot pulse valve 72, blow-tube solenoid valve 73 or cold-pulse solenoid valve 74, all of which are controlled by fluid control means (microprocessor) 28.

Figure 6:
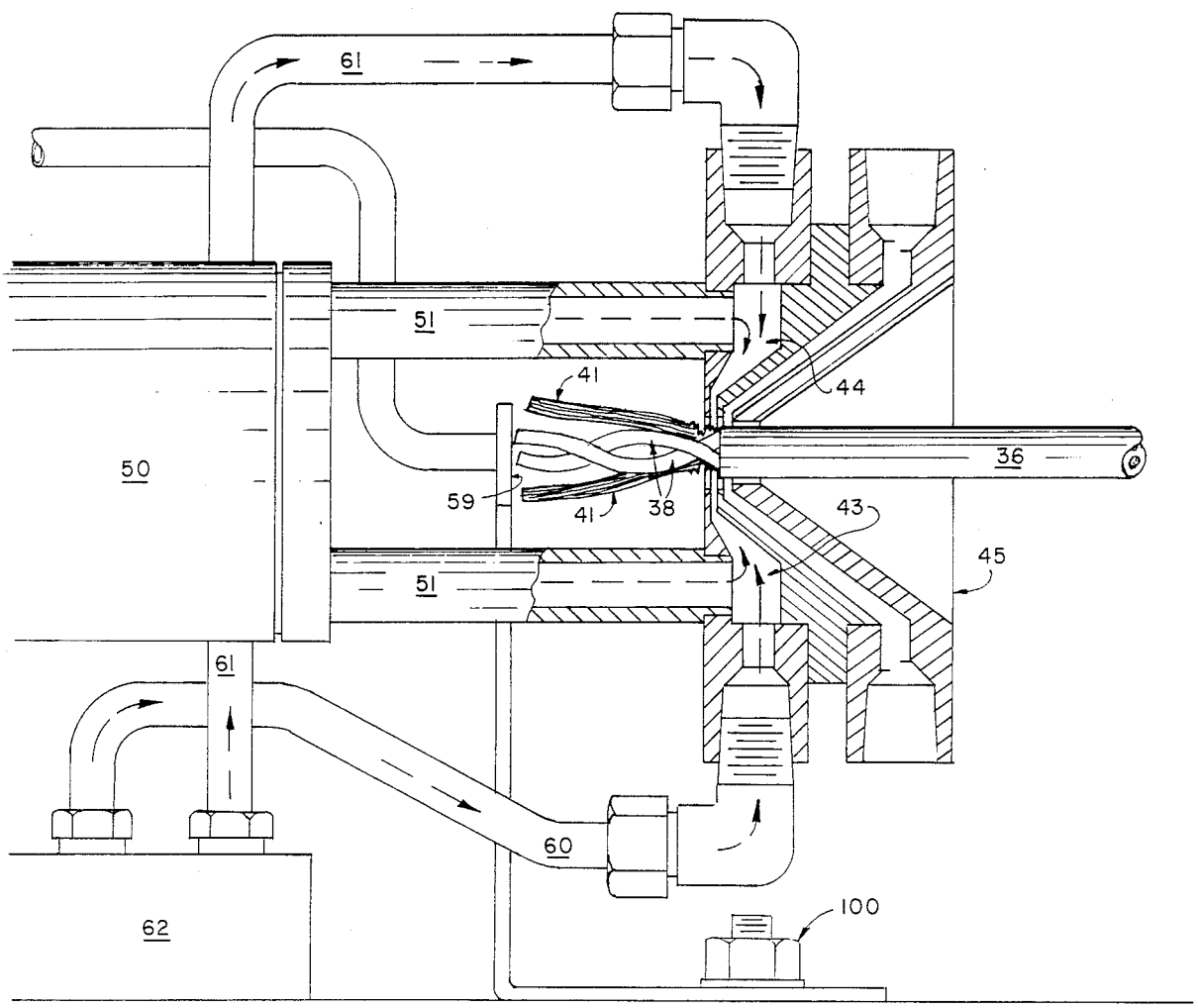
FIG. 6 shows the filler after degradation has partially begun.

Microprocessor 28 which controls valves 70-74 controls the flow through gate valve conduit 75 to operate gate 76 which regulates the air flow through blower fan hose 77 allowing communication between blower fan 78 and fluid heating means 50. Blower fan 78 delivers air at one (1) psi through gate 76 (when opened) which is controlled by solenoid gate valve 70 as earlier mentioned. As further seen in FIG. 2, blower fan hose 77 communicates with swing check valve 79 and connects to adapter 80 where air traveling therethrough is accelerated by ambient air from conduit 81 controlled by hot pulse valve 72. Hot pulse conduit 81 will provide a short pulse of ambient air which will rapidly change the pressure and air stream of the one (1) psi air through heating means 50 and heating tubes 51. These hot air pulses can then impinge exposed filler 41 as shown in FIG. 6. The hot pulsing may continue for perhaps five hundred (500) milliseconds at a measured nozzle temperature of 600° C. As heating tubes 51 may be at a temperature of approximately 600° C., cold-pulse valve 74 is used to reduce the temperature of the degradation fluid or hot air quickly from approximately 600° C. before any degradation of the conductor insulation 40 (vinyl coating) occurs. As the filler degradation is approximately fifty percent (50%) completed by the 600° C. temperature air impinging thereon, microprocessor 28 will cause the rates of the hot pulses to change as programmed to insure adequate (50%) degration, by modifying the pulses, i.e., causing a shorter pulse width and longer duration between pulses while simultaneously sending a modulated signal to cold-pulse solenoid valve 74 which will allow cold (ambient) air into nozzle 45 from cold air tubes 60 and 61. The ambient air can enter nozzle mixing chambers 43 and 44 as seen in FIG. 6 where the temperature in the mixing chamber reduces the fluid temperature therein to approximately 300° C. This rapid drop in temperature is illustrated in milliseconds in FIG. 10 where a rapid temperature drop from over 600° C. to approximately 300° C. takes place in less than one-half ($\frac{1}{2}$) of a second. The 300° C. pulse now impinges the exposed filler material 41 for perhaps one second (1000 milliseconds) to bring filler material 41 to approximately ninety percent (90%) shear. The 300° C. temperature is selected so that filler degradation will continue towards ninety percent (90%) shear at a temperature high enough to melt filler 41 but to prevent degradation to vinyl coating 40 of conductors 38 as earlier discussed. Next, microprocessor 28 stops the output signal to gate valve 70 and gate 76 closes while simultaneously therewith microprocessor 28 ceases output signals to hot-pulse valve 72 and cold-pulse solenoid valve 74 and at the same time a modulated output signal is sent to blow tube vale 73. Blow tube solenoid valve 73 has a discretely different pulse rate of perhaps two hundred fifty (250) milliseconds to blow off or remove any remaining filler 41 as shown in FIG. 7. As the air stream exits blow tubes 55, 56 and 57 at approximately eighty (80) psi, this creates a pressure differential in the nozzle area and causes the final shear to filler 41 contiguous to outer jacket 47. Cord 36 is then ready for removal from nozzle 45 and the next step in processing which may be to straighten the helically configured conductors 38 which are left in their original helixed state during filler removal. This is an advantage as subsequent cord processing steps generally rely on a consistent and uniform conductor configuration.

As previously described in some detail, to begin the operation of filler removal apparatus 20 as seen in FIG. 1, power disconnect switch 21 is thrown to its ON position and one of microprocessor cord switches 23-27 is selected and thrown ON. At the same time, nozzle thermostat sensor 42 as shown in FIG. 3 is automatically activated which allows heating means 50 to direct hot air to nozzle 45 to bring it up to a temperature limit which may be, for example, 310° C. by allowing gate 76 to open whereby air from fan 78 forces heated air through nozzle 45. Once nozzle thermostat sensor 42 reaches a predetermined temperature setting, gate 76 then closes and ON light 98 which may be, for example, green in color notifies the operator that apparatus 20 is ready for filler removal to begin. STOP light 99 as shown in FIG. 3 may be red in color and would likewise notify the operator that apparatus 20 is not ready for operation prior to nozzle thermostat sensor 42 reaching a predetermined minimum temperature. Simultaneously with the nozzle 45 being heated, microprocessor 28 "scans" cord select switches 23-27 and optical sensor 88 with reflector 89 which provides a signal to microprocessor 28 to determine if a cord has been inserted in nozzle 45. Optical sensor 88 may consist of a photoelectric cell or other sensing apparatus. FIG. 3 illustrates emergency stop switch 115 which terminates operation of apparatus 20 when emergencies or other situations where rapid shutdown of the machine is required.

Figure 4:
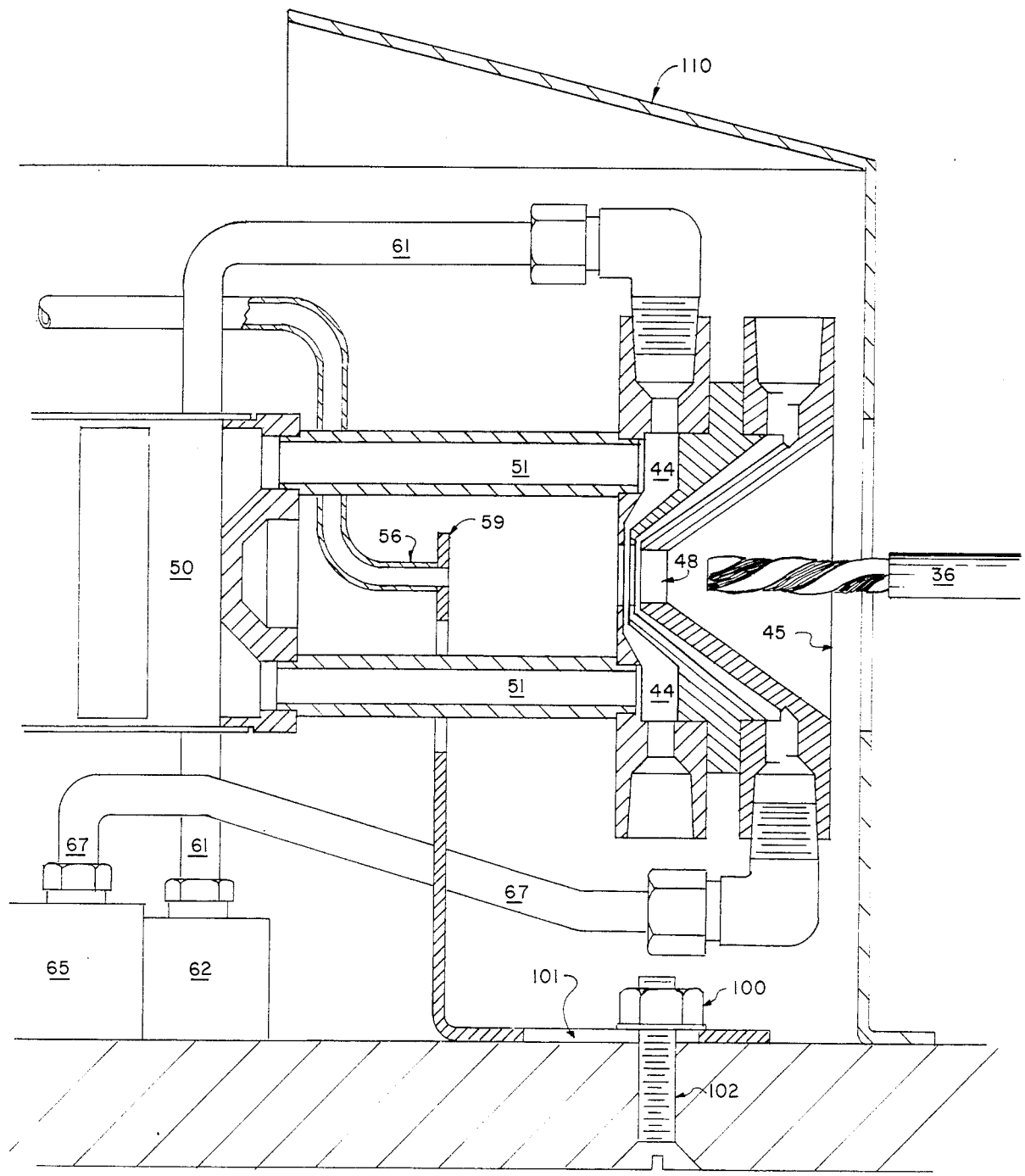
FIG. 4 demonstrates the nozzle and related components prior to full cord insertion.

The method of removing filler from electrical cord 36 includes the step of removing a portion along area 47 of outer jacket 37 as seen in FIG. 8. For example, approximately one-and-one-half ($1\frac{1}{2}$) inches have been found to be satisfactory for connection to many household appliances and this length can be varied according to the particular appliance attached. Stop means 59 as shown in FIG. 4 is adjusted for longer or shorter outer jacket removal lengths by simply releasing stop means nut 100 as seen in FIGS. 4, 5 and 6 and sliding stop means 59 with slot 101 along bolt 102 as seen in FIGS. 5 and 6. As shown in FIG. 4, stop means nut 100 threads on to bolt 102 and as would be understood, cord stop means 59 is movably positionable towards and away from nozzle 45 with blow tube 56 being flexible to accommodate such movement. When stop means 59 has been suitably adjusted and apparatus 20 is in its "idle" position after nozzle 45 has reached its desired temperature and after selection of one (1) of the microprocessor control switches 23-27, use can begin. In toggling one of the microprocessor cord switches 23-27, microprocessor 28 activates and first scans optical sensing means 88 to determine if cord 36 is properly positioned. As cord 36 has its stripped end inserted into nozzle 45 either by robotics or by manual insertion, sensing means 88 inputs a signal to microprocessor 28 which is programmed to recognize this input signal and the program contained within EE Prom 35 begins operation. Also shown in FIG. 4 is safety housing 110 which can be constructed of a screen or other suitable material for operator safety. Safety housing 110 which is easily removable contains any flying shards 54 as shown in FIG. 7 and prevents airborne debris.

At this point in the operations, two (2) simultaneous outputs occur as follows: (1) Microprocessor 28 sends an output signal to solenoid gate valve 70 energizing and pneumatically activating gate 76. Hence, blower fan 78 now moves air through gate 76 along blower fan hose 77 through swing check valve 79. Check valve 79 requires 0.25 (twenty-five one hundredths) psi to open and the air moving therethrough at one (1) psi is sufficient to open swing check valve 79 where it (air) proceeds to adapter 80 and heating means 50, through heating tubes 51 and into nozzle 45. Air at this location is approximately 600° C. where it exits the annular columnated area 53 and impinges the exposed filler 41 of cord 36. This impingement continues for approximately two hundred fifty (250) milliseconds to initiate filler degradation and the removal process. At the same time these steps are occurring, (2) microprocessor 28 sends an output signal to blow tube valve 73 which energizes and pneumatically allows air to flow through the three (3) strategically located blow tubes 55, 56 and 57 at nozzle 45. Air proceeds to blow tube manifold 58 where it enters blow tubes 55, 56 and 57 which terminate around cord filler 41 within nozzle 45. By so placing the three (3) blow tube openings in close proximity to the stripped end of cord 36, filler 41 is loosened and lifted slightly out of its tightly woven helix pattern around and between electrical conductors 38 of cord 36. Filler 41 movement (lifting) may be only slight (approximately 0.020–0.030 of an inch) but after two (2) pulses of approximately fifty (50) milliseconds each with a fifty (50) millisecond time delay between pulses, filler 41 is moved sufficiently to provide substantial advantages and benefits in later filler removal steps.

Microprocessor 28 next sends a modulated output signal to hot-pulse solenoid valve 72 whereby air at eighty (80) psi is delivered into adapter 80 and through nozzle 45 to change the pressure and air stream velocity as the air exits nozzle 45. These hot pulses which may last for only fifty (50) milliseconds increase the shear rate as they impinge upon filler 41. At this point, the filler shear is perhaps fifty percent (50%) complete and this 600° C. temperature must be reduced quickly before degradation of the conductor vinyl covering 40 occurs. Microprocessor 28 is programmed to reduce the rate of the pulse making it shorter and increasing the duration between pulses while simultaneously sending a modulated signal to cold-pulse valve 74. When cold-pulse valve 74 is energized, eighty (80) psi ambient air is delivered to cold-pulse manifold 62 where the air passes through cold-air tubes 60 and 61 as seen in FIG. 2 allowing the cold (ambient) air to mix with the hot air in nozzle mixing chambers 43 and 44 as seen in FIG. 6. Air exiting nozzle 45 will now be at approximately 290°–300° C. to impinge the exposed filler 41 for perhaps one thousand (1000) milliseconds to bring filler 41 to ninety percent (90%) shear. The 300° C. temperature as used herein can be varied but this time cycle and temperature is sufficiently short and high to cause severe degradation to the filler material without injuring vinyl coating 40 (FIG. 9). At this time the program in EE Prom 35 now stops the output signals to solenoid blower gate valve 70 whereupon gate 76 closes while microprocessor 28 also simultaneously stops the modulated output signal to both hot-pulse valve 72 and cold-pulse solenoid valve 74. Simultaneously microprocessor 28 sends a modulated output signal to blow tube solenoid valve 73 and blow-off solenoid valve 71 in slightly different pulse rates (perhaps one hundred fifty [150] milliseconds) to blow off or remove any remaining filler 41 (FIG. 7) and to finish the final ten percent (10%) of filler shearing as required. Blow tubes 55, 56 and 57 direct ambient air streams at eighty (80) psi against filler 41 where the high velocity jets of air cause filler shards 54 (FIG. 7) to split from cord 36. Cord 36 can now be withdrawn from nozzle 45 and it should be noted that filler shards 54 are removed from conductors 38 and said conductors 38 are left intact and in their original helixed state such as shown in FIG. 9. The entire operation from cord insertion to filler removal has taken approximately two-and-one-half (2½) seconds or less.

As would be understood, cords of various composition and numbers of filler strands can be employed with different programs being activable by switches 23–27 and with different program modes available to EE Prom 35 which, as seen in FIG. 3 is a plug-in module which can have five (5) or more programs contained therein supplied by a manufacturer for a variety of filler removal purposes.

The conditioned fluid which is used therein for degradation consists of heated air although other fluids including steam, gases or the like may be useful in certain applications.

Figure 10:
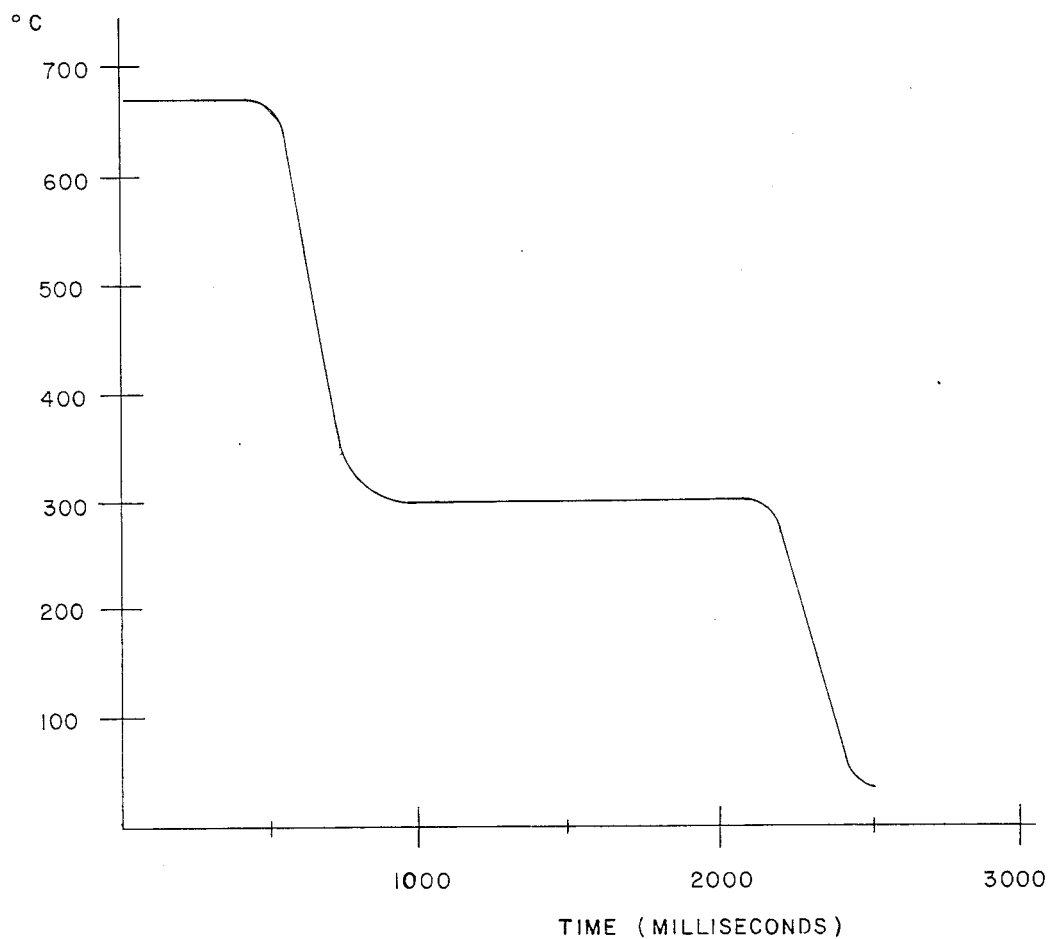
FIG. 10 illustrates a nozzle temperature curve in degrees centigrade versus milliseconds.

A nozzle temperature curve is shown in FIG. 10 which demonstrates an air temperature of approximately 700° C. resulting from the opening of hot-pulse valve 72. Cycle initiation begins when gate 76 opens allowing one (1) psi air to force approximately 700° C. air into nozzle 45 as shown in the particular conditions of FIG. 10. At approximately five hundred (500) milliseconds into the cycle cold-pulse valve 74 is also opened which, along with hot-pulse valve 72 allows hot and ambient air to mix in mixing chambers 43 and 44 which causes a rapid drop in temperature of nozzle 45 to approximately 300° C. This happens at slightly less than one (1) second into the cycle as shown in FIG. 10 at which time filler shear is approximately fifty percent (50%) complete. The 300° C. air continues to impinge filler 41 for approximately one-and-one-half (1½) seconds after which blow tube valve 73 opens at approximately two-and-one-quarter (2¼) seconds into the cycle. Blow tubes 55, 56 and 57 then deliver ambient air to filler 41 for approximately one quarter (¼) of a second dropping the temperature almost 100° C. and completing the shear of filler 41. Thus, the entire operation has taken approximately two-and-one-half (2½) seconds to complete and such time can be varied depending upon the exact filler and conductor characteristics, chemistry, temperatures used, pulse geometry and various other factors.

Various changes and alterations can be made to the present invention without departing from its intended scope and the illustrations and examples presented herein are merely for explanatory purposes.

I claim:

1. A cord receptacle for containing a cord while removing filler therefrom comprising: a cord nozzle, said nozzle having
   (a) a cord channel and
   (b) a fluid passageway, said fluid passageway encircling and communicating with said cord channel whereby fluid passing through said passageway will enter said cord channel and will contact a cord therein.

2. A cord receptacle as claimed in claim 1 and including cord stop means, said stop means adjustably affixed to said nozzle.

3. A cord receptacle as claimed in claim 1 wherein said nozzle has a conically shaped entrance.

4. A cord receptacle as claimed in claim 1 and including a plurality of fluid passageways, said passageways within said nozzle.

5. A cord receptacle as claimed in claim 1 and including a blow tube, said blow tube positioned proximate said cord channel.

6. A cord receptacle as claimed in claim 1 and including a fluid mixing chamber, said chamber communicating with said fluid passageway.

7. A cord receptacle as claimed in claim 1 and including cord sensing means, said sensing means positioned proximate said cord channel.

8. A cord receptacle as claimed in claim 1 and including cord guiding means, said guiding means positioned on said nozzle.

9. A cord receptacle as claimed in claim 1 wherein said fluid passageway includes a columnated portion, said columnated portion 6, communicating with said cord channel.

10. Apparatus for removing filler from cords comprising: a cord nozzle, said nozzle for positioning a cord for filler removal, a fluid conduit, said conduit encircling within said nozzle, said conduit positioned for directing a filler degradation fluid around said cord positioned within said nozzle, filler degradation fluid conditioning means, said conduit communicating with said conditioning means whereby fluid will pass from said conditioning means through said conduit around said cord for filler degradation.

11. Apparatus as claimed in claim 10 and including fluid control means, said fluid control means communicating with said fluid conditioning means.

12. Apparatus as claimed in claim 11 wherein said fluid control means includes a microprocessor.

13. Apparatus for removing filler from cords as claimed in claim 10 and including fluid directing means, said directing means communicating with said fluid conditioning means.

14. Apparatus for removing filler from cords as claimed in claim 10 and including fluid supply means, said supply means communicating with said nozzle.

15. Apparatus for removing filler from cords as claimed in claim 10 including regulating means, said regulating means communicating with said nozzle.

16. Apparatus for removing filler from cords as claimed in claim 15 and including fluid control means, said regulating means connected to said control means.

17. Apparatus for removing filler from electrical cords comprising: a cord nozzle, said nozzle having a cord channel for receiving a cord having a portion of its outer jacket removed, said nozzle including a fluid conduit, said conduit communicating with said cord channel, cord stop means, said stop means positioned proximate said cord channel to stop the movement therethrough of the cord, cord sensing means, said sensing means positioned proximate said stop means to determine placement of the cord through said channel, fluid conditioning means, said conditioning means communicating with said nozzle for directing conditioned fluid therethrough, fluid control means, said control means communicating with said fluid conditioning means to control the conditioned fluid to said nozzle for causing degradation to the filler of the cord positioned in said nozzle.

18. Apparatus for removing filler from electrical cords as claimed in claim 17 and including ambient fluid supply regulating means, said regulating means in communication with said fluid control means.

19. Apparatus for removing filler from electrical cords as claimed in claim 18 and including an ambient fluid supply means, said ambient fluid supply means for supplying fluid to said ambient fluid supply regulating means.

20. Apparatus for removing filler from electrical cords as claimed in claim 19 and including a blow tube, said blow tube positioned proximate said nozzle, said blow tube communicating with said ambient fluid supply for directing ambient air against the cord positioned in said nozzle to assist in removing the filler therefrom.

21. A method of removing filler from electrical cords comprising: stripping the outer jacket from an electrical cord to expose the filler, inserting the stripped cord into a nozzle channel and thereafter causing degradation to the filler by directing conditional fluid against the filler while the cord is in said channel.

22. A method of removing filler from electrical cords as claimed in claim 21 wherein the conditioned fluid comprises air.

23. A method of removing filler from electrical cords as claimed in claim 21 wherein the step of inserting the stripped cord into a nozzle channel comprises inserting the stripped cord through the channel to a cord stop means.

24. A method of removing filler from electrical cords as claimed in claim 22 wherein the step of directing conditioned air comprises directing heated air against the filler.

25. A method of removing filler from electrical cords as claimed in claim 21 and including the step of directing ambient air against the filler after directing conditional fluid against the filler.

* * * * *